Figure 1:
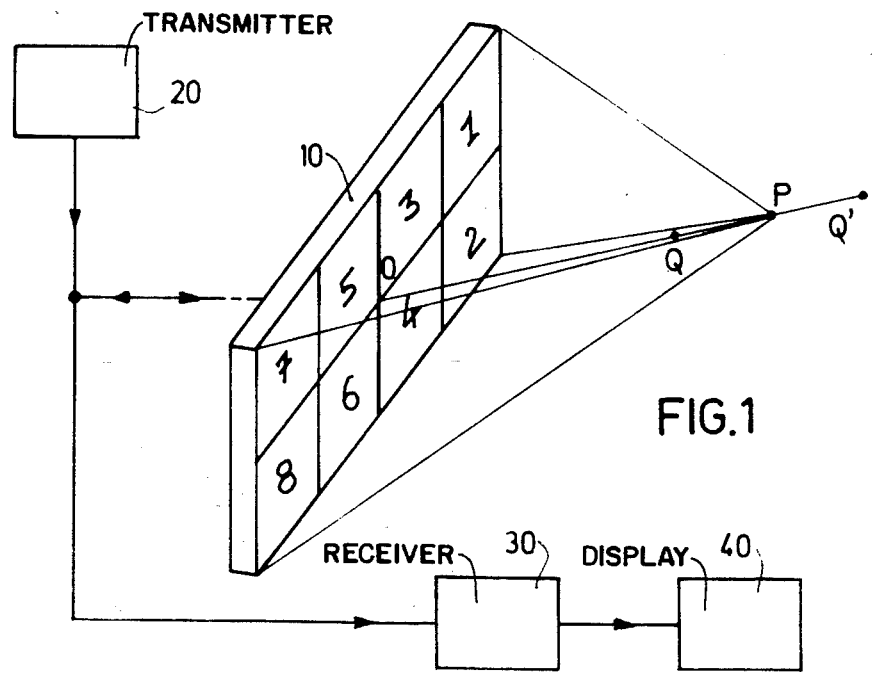

United States Patent [19]

Auphan

[11] Patent Number: 4,552,020
[45] Date of Patent: Nov. 12, 1985

[54] APPARATUS FOR THE SCANNING OF OBJECTS BY MEANS OF ULTRASOUND ECHOGRAPHY

[75] Inventor: Michel J. Auphan, Paris, France

[73] Assignee: U.S. Philips Corporation, New York, N.Y.

[21] Appl. No.: 542,841

[22] Filed: Oct. 17, 1983

[30] Foreign Application Priority Data

Oct. 20, 1982 [FR] France .................................. 82 17550
Sep. 28, 1983 [FR] France .................................. 83 15422

[51] Int. Cl.$^4$ ............................................. G01N 29/04
[52] U.S. Cl. ........................................ 73/602; 73/625; 367/100; 364/821
[58] Field of Search ................ 73/602, 609, 625, 626; 367/40, 100, 125, 126; 364/507, 728, 821, 824

[56] References Cited

U.S. PATENT DOCUMENTS

| 3,561,430 | 2/1971 | Filler et al. ........................... 128/653 |
| 4,252,025 | 2/1981 | Robinson ............................... 73/621 |
| 4,471,785 | 9/1984 | Wilson et al. .......................... 73/602 |
| 4,484,477 | 11/1984 | Buxton ................................. 73/626 |

Primary Examiner—Stewart J. Levy
Assistant Examiner—John T. Chapman, Jr.
Attorney, Agent, or Firm—Jack E. Haken

[57] ABSTRACT

An apparatus for the scanning of objects by means of ultrasound echography, comprising a mosaic (10) of ultrasound transducers which is connected to a transmitter stage (20) and a receiver stage (30) for the reception and processing of the ultrasound echos corresponding to the obstacles encountered by the transmitted signals in their direction of propagation, and also comprising a display stage (40). The transducers of the mosaic (10) are grouped in $2^n$ subwindows in which a non-corrected echogram of an area of the objects scanned is formed. The receiver stage (30) comprises a device for determining correction delays to be applied to delay devices (61 ... 68), said device comprising $2^n - 1$ intercorrelation circuits (101, 102, etc.) which operate on the basis of n successive divide-by-two operations of the aperture of the mosaic (10).

5 Claims, 4 Drawing Figures

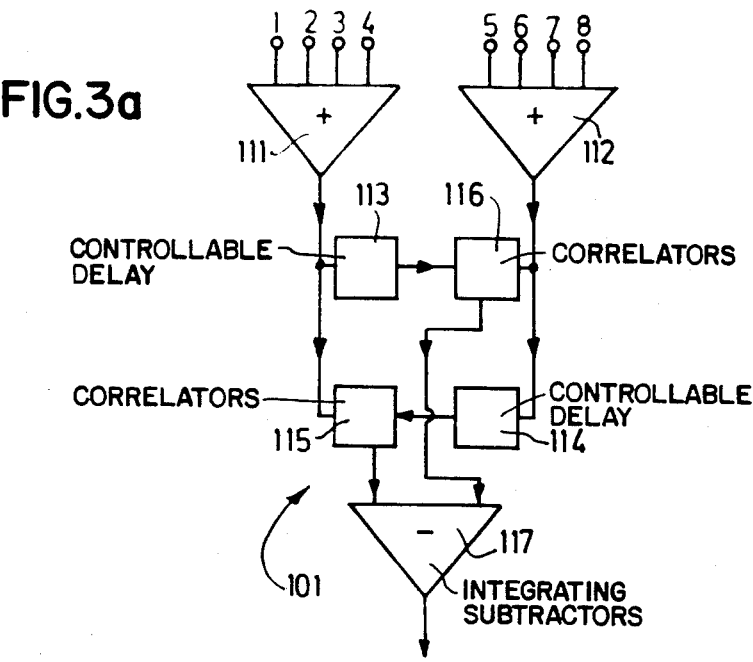
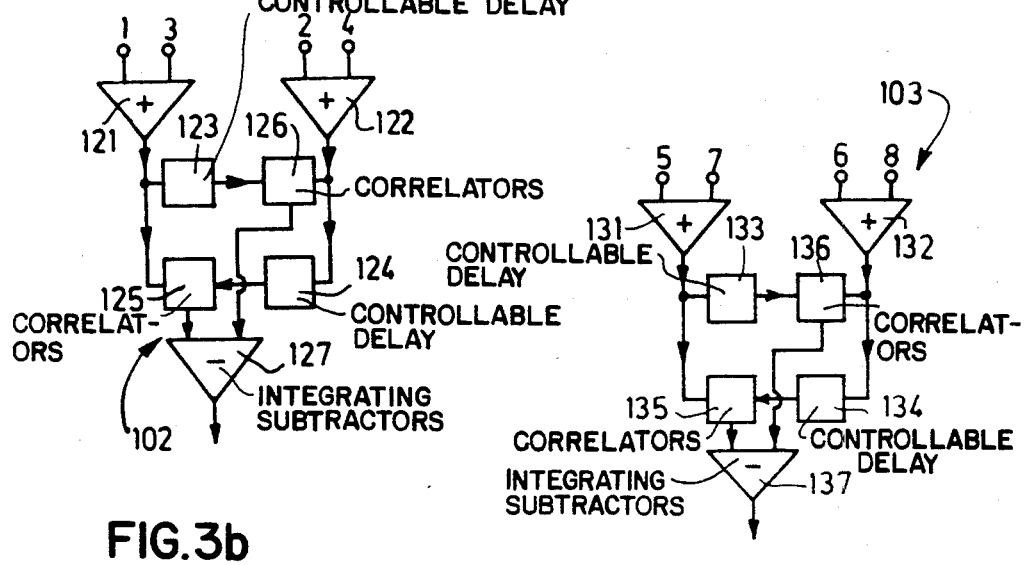
FIG.3a
FIG.3b
FIG.3c

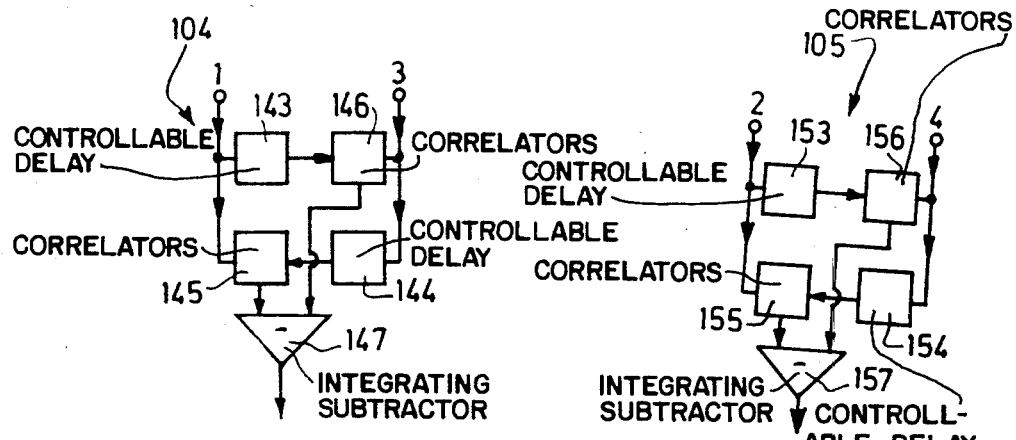
FIG.3d
FIG.3e
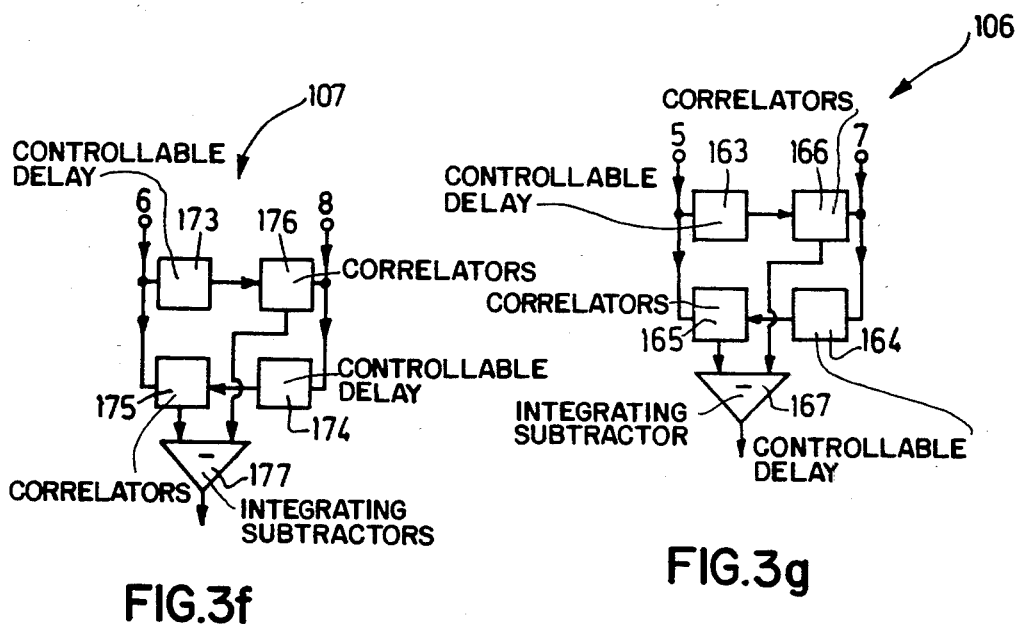
FIG.3f
FIG.3g

APPARATUS FOR THE SCANNING OF OBJECTS BY MEANS OF ULTRASOUND ECHOGRAPHY

The invention relates to an apparatus for the scanning of objects, notably biological tissues, by means of ultrasound echography, comprising a mosaic of ultrasound transducers which is connected to a transmitter stage for the repeated transmission of ultrasound signals, and to a receiver stage for the reception and processing of the ultrasound echos which correspond to the obstacles encountered by the transmitted signals in their direction of propagation, and also comprising a display stage for the display of the ultrasound images reconstructed in the receiver stage.

If the ultrasound speed of propagation in an object to be examined were exactly constant and if the mechanical and electronic systems for the display were perfect, the echos originating from the same obstacles would be exactly coincident in the image, regardless of the direction of the scanning axis. However, this is never achieved in practice; the fluctuations of the ultrasound speed within the object being examined give rise to propagation errors which are more pronounced as the aperture used is larger; consequently, corrections will be required.

From U.S. Pat. No. 4,252,025 it is known to analyze the distinct positional differences of the echos corresponding to the same obstacle in the receiver stage of the echography apparatus by means of an intercorrelation device which compares two different signals obtained in two different scanning positions and which determines the actual position in which the correspondence between the two signals is best. Unfortunately, no concrete indication whatsoever is given as regards the actual construction of such a receiver stage.

It is an object of the invention to provide an apparatus for the scanning of objects by means of ultrasound echography whose receiver stage simply corrects propagation errors which are due to the heterogeneous nature of the speed of the ultrasound waves.

To this end, an apparatus of the kind set forth in accordance with the invention is characterized in that the transducers of the mosaic are grouped in $2^n$ subwindows, n being a positive integer number, each subwindow being formed by a group of adjacently situated elementary transducers, each of said subwindows being suitable to form a non-corrected echogram of an area of the objects scanned, the receiver stage successively comprising, subsequent to a focussing and image scanning device arranged at the exit of the mosaic, $2^n$ parallel channels, each of which comprises a controllable delay device and a memory for the storage of the delay introduced by this device, said channels being followed by an adder circuit and an evaluation circuit, the output of the evaluation circuit being connected to the display stage, the receiver stage also comprising a device for determining the correction delays to be applied to each delay device, said device for determining the correction delays itself comprising $2^{n-1}$ intercorrelation circuits which operate on the basis of n successive divide-by-two operations of the aperture of the mosaic, that is to say so that during a first division-by-two operation both groups of transducers which are formed by the $2^{n-1}$ first subwindows and the $2^{n-1}$ other subwindows are compared by means of the first intercorrelation circuit, the same divide-by-two process being subsequently performed in each of the two groups thus successively formed until each intercorrelation circuit has had its turn.

Figure 2:
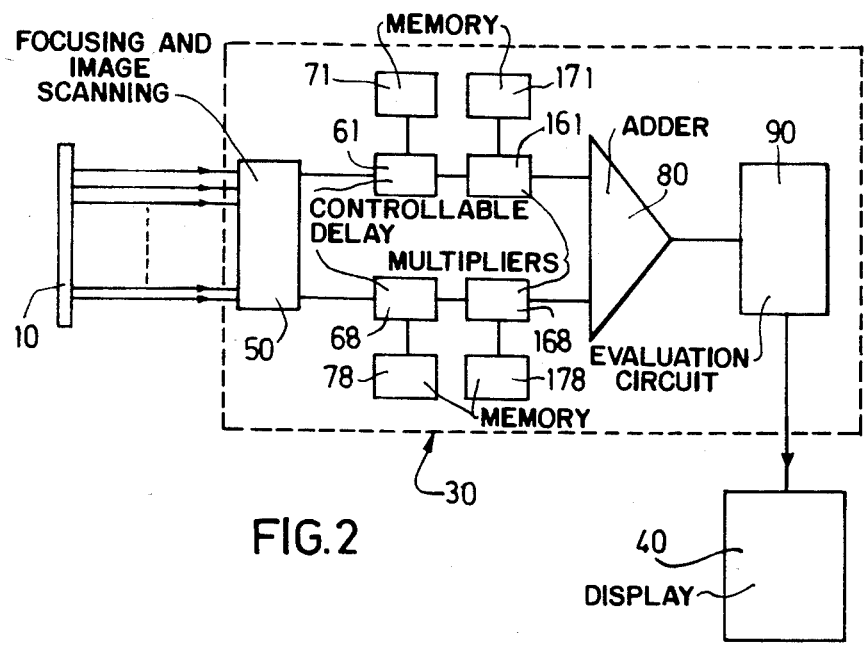
Figure 2A:
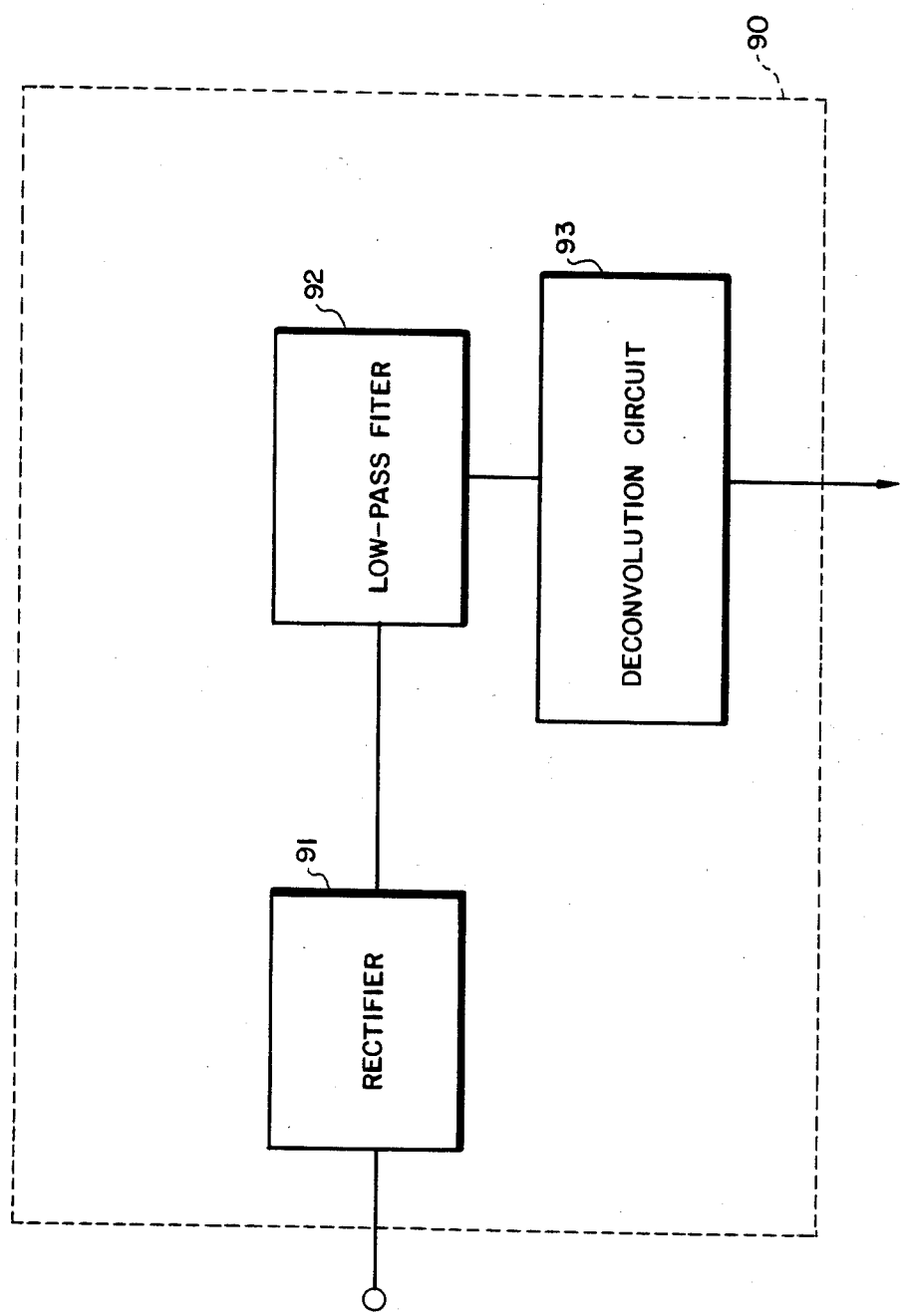

The invention will be described in detail hereinafter with reference to the accompanying drawings. Therein:

FIG. 1 is a simplified diagrammatic view of the apparatus in accordance with the invention, FIG. 2 shows a detailed diagram of the receiver stage of the apparatus shown in FIG. 1, FIG. 2a shows a detail of an element in FIG. 2, and FIG. 3 shows the construction of the intercorrelation circuit used in the receiver stage shown in FIG. 2.

The present embodiment of the apparatus in accordance with the invention comprises a rectangular mosaic 10 of elementary ultrasound transducers, a transmitter stage 20 for the periodic transmission of ultrasound signals, a receiver stage 30 for the reception and processing of the ultrasound echos which correspond to the obstacles encountered by the transmitted signals in their propagation direction, and a display stage 40 for the display of the ultrasound images reconstructed in the receiver stage 30.

The following principle underlies the above apparatus. Considering the size of the aperture, being very large in order to achieve a high image resolution, this aperture is divided into a number of subwindows, each of which is formed by a group of adjacently situated elementary transducers of the mosaic; in each subwindow a non-corrected echogram is made of an area of the object being examined. The corrections to be made are determined only at a later stage by an attempt to obtain a maximum value for the intercorrelation functions between the echo signals which originate from two parts of the aperture and which correspond to one and the same line segment QQ' (see FIG. 1). In order to avoid the necessity of processing all intercorrelation functions, the aperture is divided into a number of subwindows by way of successive divide-by-two operations. Subsequently, the intercorrelation function between two groups of subwindows is searched, after which identical corrections of opposite sign are applied to the subwindows of each group, the different corrections thus determined (in the example described hereinafter, on the one hand delays or advances and on the other hand amplifies or attenuates) thus being accumulated for one and the same subwindow so that the pyramid-like correction process via divide-by-two operations produces a specific correction for each subwindow (three successive divide-by-two operations are performed in the embodiment to be described hereinafter).

For delays or advances it will be evident that in the apparatus to be described hereinafter the predetermined corrections for the focussing are superposed on the individual delays assigned to each elementary transducer of the mosaic 10. This is because in most prior art ultrasound echography apparatus the various points of the image to be reconstructed are scanned by focussing on these points; this takes place in principle during transmission and during reception. Such focussing is achieved by addition of the signals which are supplied by each element of the mosaic and which are delayed by a suitable value.

In order to simplify the above principle, moreover, two assumptions are made: the corrections to be made in accordance with the invention, being dependent on the point on which focussing takes place, are assumed to be very near to one another when these points are situated near one another; this means that these corrections vary slowly during the scanning of the image, so that they can be readjusted by means of a simple process such as a process of intercorrelations with two channels which only serve to determine the direction in which the corrections have to be changed; the other assumption is that these corrections are very near to another for two adjacent elements of the mosaic, so that they can be applied per group of adjacent elements or subwindows; the number of such groups may be limited, so that the need for an excessively large number of correction circuits is avoided.

Following this description of the principle, the ultrasound section of the apparatus in accordance with the invention will be described in detail hereinafter. This section is shown in simplified form in FIG. 1 which shows the mosaic of elementary transducers which is acoustically coupled to the object to be scanned (during the scanning operation, at a given instant focussing takes place on the point P which is situated on the line segment QQ', all transducers of the mosaic then being connected to an assembly of programmable delay lines and adder circuits). This ultrasound section is shown in greater detail in FIG. 2 which will be described hereinafter.

In order to achieve the three successive divide-by-two operations, the outputs of the mosaic 10 are arranged in eight subwindows 1 . . . 8 (for n divide-by-two operations, $2^n$ subwindows would be required), each of which is connected, via a focussing and image scanning device 50, on the one side to a controllable delay device 61 . . . 68 and a memory 71 . . . 78 for the storage of the delay obtained by means of this device, and on the other side to a multiplier circuit 161 . . . 168 and a memory 171 . . . 178 for the storage of the amplitude correction factors. The multiplier circuits 161 . . . 168 with the associated memories 171 . . . 178 are required only if correction is also required for the propagation errors caused by difference in the absorption of the ultrasound waves. The output signals of the circuits 161 . . . 168 are applied to an adder circuit 80 whose output is connected to an evaluation circuit 90 which is followed by the image memory of the display stage 40.

The evaluation circuit 90 comprises for example (FIG. 2a) a rectifier 91 which is followed by a low-pass filter 92 for determining the envelope of the signal. It may be followed or preceded by a deconvolution circuit 93 for deconvolution of the signal with a function which represents a property of the signal and which comprises one or more given parameters such as the excitation signal of the elementary transducers, the electroacoustic transfer function of an elementary transducer during reception and/or transmission, or the near-field characteristic of the relevant subwindow.

The time corrections are determined by means of seven intercorrelation circuits 101 . . . 107 which are shown in FIG. 3. The construction of the circuit 101, being used in the first divide-by-two stage, is similar (like the circuits 102 . . . 107) to that of an adaptive filter: it is formed by two adder circuits 111 and 112, comprising four inputs which receive the output signals of the subwindows 1 . . . 4 and 5 . . . 8, respectively, two delay lines 113 and 114 having a variable delay time T so that the delay line 113 produces a delay $+T$ and the delay line 114 a delay $-T$, two correlation circuits 115 and 116, and an integrating subtraction circuit 117. Thanks to this construction, the delay $T_1$ to be applied to the memories 71 . . . 74 and the delay $T_2$ to be applied to the memories 75 . . . 78 can be determined simply by variation of T. It will be evident that in the circuit 101 the output signal of the integrating subtraction circuit becomes zero for a given value $T_0$ of T and that the delays $T_1$ and $T_2$ are thus determined by the expressions $T_1 = T_0/2$ and $T_2 = -T_0/2$. Therefore, it is merely necessary to vary the value of T so that the output signal of the integrating subtraction circuits 117 becomes zero. Depending on the signal obtained, the output signal of the circuit 117 is made equal to zero by an increase or decrease of the delay T.

The said correlation circuits are of a known type which have been disclosed in several publications, for example in "Méthodes et techniques de traitement du signal et applications aux measures physiques", Vol. 2, chapter XVIII, entitled "Principaux corrélateurs électroniques" by J. Max et. al. published by Masson (France). If, after determination of the value $T_0$ in the described manner, their circuits are also to be used for amplitude corrections, the value of each output signal is determined for a value $T_A$ of T where $T_A - T_0$ has a predetermined value which is the same for all divide-by-two stages. This values of the output signals are then standardized and stored in the memories 171 . . . 178.

Each of the circuits 102 and 103 used for the second divide-by-two operation also comprises two adder circuits 121, 122 and 131, 132, respectively, with two inputs which receive the output signals of the subwindows 1, 3 and 2, 4, respectively, for the adder circuits 121, 122 and of the subwindows 5, 7 and 6, 8, respectively, for the adder circuits 131, 132 and also two delay circuits 123, 124 and 133, 134, respectively, two correlators 125, 126 and 135, 136, respectively, and an integrating subtraction circuit 127, 137, respectively, whose output signal performs the same functions as above. Similarly, for the third divide-by-two operation each of the four circuits 104 . . . 107 (in which no adder circuits are required because these circuits receive only the output signal of one subwindow on each of the inputs) comprises two delay circuits (143, 144), (153, 154), (163, 164), (173, 174), two correlators (145, 146), (155, 156), (165, 166), (175, 176), and a substraction circuit (147, 157, 167, 177) whose output signal again performs the same functions. The corrections thus determined can be applied to the transducers during transmission as well as during reception.

Evidently, the invention is not restricted to the embodiment described above; various alternatives are feasible within the scope of the invention. It is to be noted in particular that there is preferably provided a circuit for the validation of the intercorrelation circuits in order to ensure that during the generation of correlation delays and amplitude correction factors by way of the pyramid-like process of successive divide-by-two operations, only the signals are conducted which correspond to the line segment QQ' in the vicinity of the point P. The receiver stage of the apparatus in accordance with the invention has two modes of operation: one in which the ultrasound information is processed as it is supplied by the mosaic, and one in which the operation of the receiver stage is delayed because the signals transmitted and received by the mosaic are stored in a memory, followed by the execution of correction and focussing operations on these signals. It is also to be noted that in many cases analog circuits are preferably replaced by digital circuits; this could be done in the receiver stage 30 in this case.

What is claimed is:

1. Apparatus for scanning objects by ultrasound echography which comprises:
   a mosaic of ultrasound transducer elements;
   transmitter means connected to the transducer elements which cause the elements to repeatedly transmit ultrasound signals;
   receiver means connected to the transducer elements for receiving and processing echo signals which are produced when the transmitted ultrasound signals are reflected; and
   display means for displaying images which are processed and reconstructed from the signals produced in the receiver means; wherein, as an improvement:
   the elements of the mosaic are grouped into $2^n$ subwindows, where n is a positive integer greater than one, and each subwindow is a group of adjacent transducer elements which are sufficient to form an echogram of an area of the object, and
   the receiver means comprise, in functional series connection:
   focusing and image scanning means for controlling directional characteristics of the mosaic;
   $2^n$ parallel signal channels, each channel processing signals from a subwindow and comprising controllable delay means and a first memory for storing a delay value correction factor which controls the delay means;
   adder means which combine the outputs of the channels;
   evaluation circuit means, the output of the evaluation circuit means being connected to the delay stage; and additionally comprising
   $2^n - 1$ correlation means which operate to determine correction factors by adaptively correlating signals which are derived from progressive binary subgroupings of subwindows of elements, where a first subset of the $2^n - 1$ of the correlation means process signals from respective pairings of the subwindows and other correlation means compare signals from progressive pairings of the pairs of subwindows.

2. Apparatus as claimed in claim 1 wherein each of the $2^n$ parallel channels further comprises a multiplier circuit and a second memory for the storage of amplitude correction factors.

3. Apparatus as claimed in claim 1 or 2, wherein the evaluation circuit means comprise a rectifier followed by a low-pass filter.

4. Apparatus as claimed in claim 3, wherein the evaluation circuit means further comprise a deconvolution circuit connected in series with the rectifier and the filter.

5. Apparatus as claimed in claims 1 or 2, wherein at least one of the correlation means comprises two adder circuits, two delay circuits, two correlation circuits, and an integrating subtraction circuit, the output of a first adder circuit being connected directly to the first correlation circuit and also, via a first delay circuit, to the second correlation circuit, the output of a second adder circuit being connected directly to the second correlation circuit and also, via a second delay circuit, to the first correlation circuit, the outputs of the first and the second correlation circuits being connected to inputs of the subtraction circuit, the output signals of the subtraction circuits being stored in the respective memories.

* * * * *